C. H. D. HUNTER.
INTERNALLY HEATED COOKING OVEN AND THE LIKE.
APPLICATION FILED MAY 27, 1913.
1,099,050.
Patented June 2, 1914.
2 SHEETS—SHEET 1.
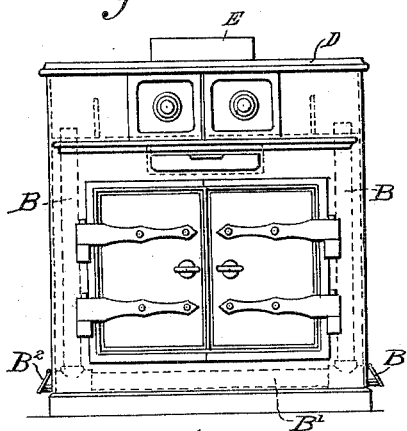
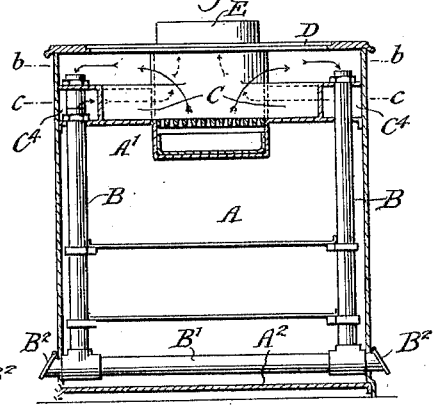
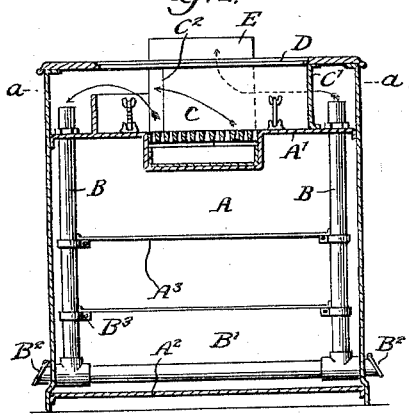
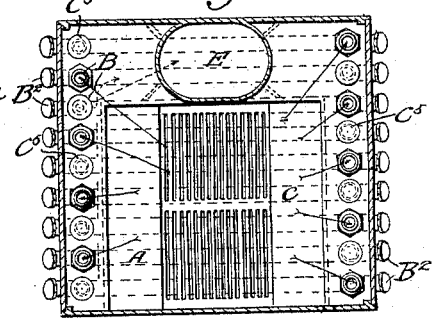
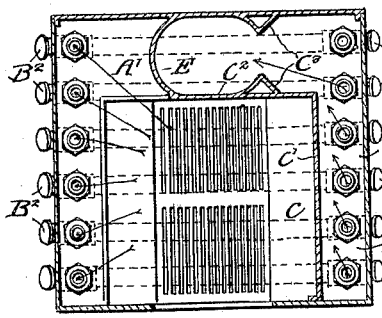
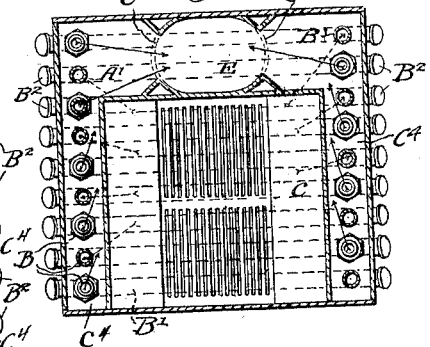
Inventor
Charles H. D. Hunter
Witnesses

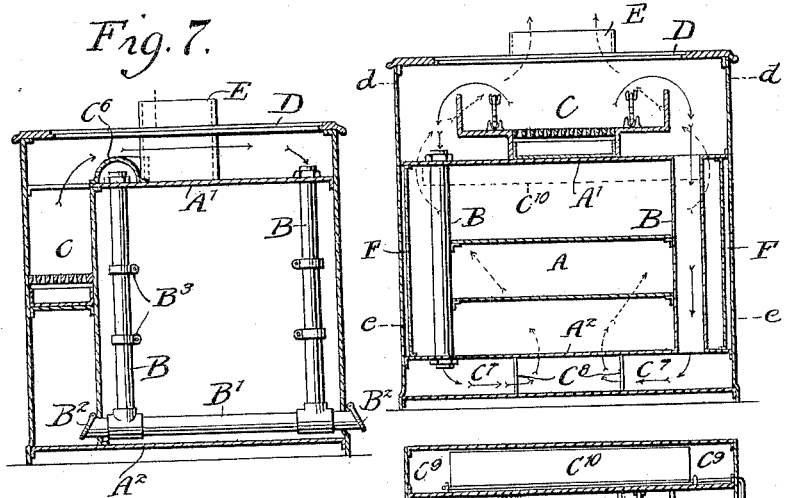
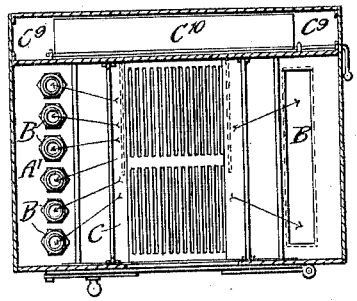
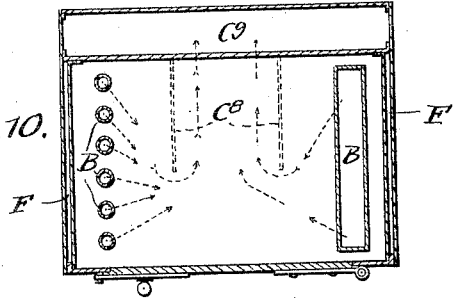

UNITED STATES PATENT OFFICE.

CHARLES HOPE DOUGLAS HUNTER, OF MELBOURNE, VICTORIA, AUSTRALIA.

INTERNALLY-HEATED COOKING-OVEN AND THE LIKE.

1,099,050.

Specification of Letters Patent.

Patented June 2, 1914.

Application filed May 27, 1913. Serial No. 770,220.

*To all whom it may concern:*

Be it known that I, CHARLES HOPE DOUGLAS HUNTER, a subject of the King of Great Britain, residing at 175 William street, Melbourne, in the State of Victoria, Commonwealth of Australia, manufacturer, have invented certain new and useful Improvements in Internally-Heated Cooking-Ovens and the like, of which the following is a specification.

This invention relates to improvements in cooking stoves and the like, and refers more particularly to one fire stoves having a single oven and where the fire grate is arranged in a central position above or at one side of the same. The improvements by slight alterations are applicable to cooking ranges having double ovens and the fire grate arranged between the same.

The object of the invention is to provide means whereby instead of the heat from the fire being circulated in flues disposed about the outside of the oven proper as in ordinary stoves the heat is circulated through the interior of the oven and in such a manner that there is no waste heat as all the heat available from the combustion of the fuel is utilized in heating the oven and in such a manner that the same is maintained at an even or uniform temperature. To accomplish these objects the ordinary outside flues or passages through which the heat fumes pass are dispensed with and a series of tubes of regular or irregular shape are arranged inside the oven in such a manner that the heat from the fire circulates through the said tubes and in so doing distribute the heat through the oven much more evenly and with less consumption of fuel than can be done at present with stoves having the outside flues. Means are provided for permitting brushes and the like to be passed through the tubes and flues to remove all soot and ashes from the same.

It will be understood that the arrangement of the tubes will depend on the position in which the fire grate is situated, but in all cases where circulating tubes are employed they will be arranged inside the oven proper.

In order that the invention may be more clearly understood reference will now be made to the accompanying sheets of drawings which illustrates a one fire stove embodying the improvements.

Referring to the drawings:—Figure 1 is a front elevation of an ordinary one fire stove with the fire grate arranged in a central position above the oven, and Fig. 2 is a vertical section of same. Fig. 3 is a section on line $a$—$a$ of Fig. 2. Fig. 4 is a view similar to Fig. 2 showing a modification in the arrangement of the circulating tubes. Fig. 5 is a sectional plan taken on line $b$—$b$ of Fig. 4. Fig. 6 a sectional plan taken on line $c$—$c$ of Fig. 4. Fig. 7 is a vertical section of a one fire stove having the fire place arranged at one side of an oven. Fig. 8 is a vertical section showing a further modification of the circulating tubes or flues. Figs. 9 and 10 are sectional plans on lines $d$—$d$ and $e$—$e$ respectively of Fig. 8.

In construction a cooking stove as shown in Figs. 1 to 3 of the drawings the oven A may extend the full width of the frame work, and be fitted internally with a series of heat circulating tubes B, $B^1$ of any desired shape or section, the vertical tubes B being supported from the top plate $A^1$ with their ends projecting slightly above the same. These vertical tubes B are arranged in pairs at both sides of the oven and each pair is connected at their lower ends to a horizontal tube $B^1$ which is also arranged inside the oven just above the bottom plate $A^2$. The ends of the horizontal tubes $B^1$ project through the side walls and preferably are beveled off and furnished with "gravity" covers or doors $B^2$ for cleaning out purposes.

The fire-place C is situated in a central position at the top of the oven A and if desired may be made removable. The fire-place is constructed as shown in Figs. 2 and 3 with a side wall $C^1$ and a portion of its back $C^2$ extending up to the top plate D of the stove in order to form a passage or flue $C^3$ for delivering the smoke and fumes from the discharge ends of the tubes B to the discharge duct or flue E arranged at the back of the fire-place C.

It will be seen that the heat fumes from the fire-place C pass in the direction indicated by the arrows down the tubes B at one side of the oven, through the horizontal tubes $B^1$ up the tubes B at the opposite side of the oven and thence through the flue $C^3$ to the outlet duct or flue E. Thus the heat circulates through the interior of the oven and in so doing makes a three quarter circuit of the same.

In order to clean the tubes a brush may be inserted in the vertical tubes B and then through the horizontal tubes B¹ the soot being discharged through either end of the lastmentioned tubes. In order to convey the heat from the fire-place C direct to tubes at each side of the oven A as indicated by the arrows in Figs. 4, 5 and 6 a suitable flue or duct C⁴ is formed between the top A¹ of the oven A and the top plate D of the stove. This flue C⁴ connects with the flue C³ leading to the discharge duct E. One of the vertical tubes B of each pair terminates in the flue C⁴ just above the top A¹ of the oven A while the other tube B of the pair passes through the flue C⁴ into the space between the top of the flue C⁴ and the top plate D of the stove. Thus it will be seen that the heat from the fire-place C passes into the longest of the tubes B¹ at each side of the oven A, through the horizontal tubes B¹ up the short vertical tubes B and thence into the flue C⁴ which conveys or delivers the smoke and fumes to the discharge duct E. By this arrangement of tubes the same temperature of heat is delivered into the oven at each side thereby causing all parts of the oven to be maintained at the same temperature. In order to enable the short vertical tubes B to be cleaned the top portion of the flue C⁴ is furnished with removable plates C⁵ which when removed enable a brush to be inserted in the said short interval tubes B.

To support the oven sheets A³ for carrying cooking vessels suitable adjustable clamps B³ are attached at desired points to any number of the vertical tubes B and these clamps are so constructed that they may be held firmly in position and at the same time support the oven sheets A³.

In the stove shown in Fig. 7 the fire-place is situated at one side of the oven and the tubes B and B¹ are arranged similarly to those shown in Figs. 1 to 3 of the drawings. In order to cause the heat to circulate through the oven a suitable semi-circular removable cover C⁶ is adapted to be placed over the top ends of all of the series of vertical tubes B located next the fire-place C. This cover C⁶ forms the flue or passage C³ leading to the discharge duct E, and is made removable in order to enable the tubes B to be cleaned. The direction taken by the heat fumes is indicated by the arrows passing from the fire-place to the flue E.

In the modified arrangement shown in Figs. 8, 9 and 10 the horizontal tubes B¹ shown in other figures are dispensed with, and the vertical tubes B are adapted to deliver the heat fumes through the oven A into the ordinary chamber or flue C⁷ situated under the bottom of the oven, and in which flue is arranged the necessary baffle plates C⁸ which cause the fumes to circulate about the bottom of the oven before passing up the back flue C⁹ behind the oven A to the discharge duct E.

In order to cause the heat to circulate about the back of the oven, a suitable adjustable damper or baffle C¹⁰ is fitted in the back flue C⁹ to cause the heat fumes to spread and take a course indicated by the arrows in dotted lines in Fig. 8. The said damper C¹⁰ can be supported pivotally in the flue C⁹ and it can be provided with an externally disposed operating handle for adjusting it to any desired position therein.

It will be seen that at the left hand side of each of the Figs. 8, 9 and 10 is shown a series of circular tubes B while on the right hand side of the same a rectangular shaped tube B is shown, this is to illustrate that either a series of circular or other shaped tubes B may be employed, at each side of the oven or if desired a single rectangular shaped tube may be substituted for the said circular tubes B.

If desired any suitable non-conducting material F such as asbestos may be fitted inside the oven where necessary or desirable in order to retain the heat therein. If preferred, the flues C⁷, C⁸ and C⁹ can be made in the brick-work or other setting where the oven is intended to be built in a chimney or the like. Moreover, it will be readily understood that the improvements can be as readily adapted to ovens designed for setting in brickwork as to those made to stand independently thereof.

What I do claim is:—

1. In a heater the combination of a frame or casing provided with an oven chamber, a fire place, a chamber disposed above the oven chamber and subdivided by fixed walls providing non-communicating compartments, an outlet flue, one of said compartments being in constant communication with the fire place and the other with the outlet flue, up and down draft conductors on each of the opposite sides of and within the oven chamber and communicating at their upper ends with the respective compartments of said upper chamber, horizontal conductors connecting the lower ends of said up and down draft conductors in pairs, said horizontal conductors having normally opened beveled ends, and gravity closing doors guarding the said beveled opened end of said horizontal conductors.

2. In a heater, the combination of a frame or casing provided with an oven chamber, a fire place disposed centrally at the top of the frame or casing and out of communication with the oven chamber, a chamber disposed above the oven chamber and provided with fixed walls forming compartments, one of said compartments being always in communication with the fire place and the other out of communication therewith, an outlet communicating with the latter named compartment, and up and down draft conductors on each of the opposite sides of and within the oven chamber and communicating at their lower ends with each other and at their upper ends with the respective compartments.

3. In a heater, the combination of a frame or casing provided with an oven chamber, a fire place disposed centrally at the top of the oven chamber and out of communication therewith, an outlet flue, a pair of superposed, non-communicating compartments at the top of the frame or casing above the oven chamber, the lower compartment being in communication with the outlet and the upper compartment in communication with the fire place, long and short up and down draft flues on each of the opposite sides of and within the oven chamber, the long flues communicating with the upper compartment and the short flues with the lower compartment, said flues alternating at opposite sides of the casing, and horizontal conductors connecting the lower end of each long flue at one side of the oven chamber with the lower end of a short flue at the opposite side of the oven chamber.

4. In a heater, the combination of a frame or casing having an oven chamber, a chamber disposed above the oven chamber and subdivided to provide compartments, a fireplace communicating with one of said compartments, an outlet communicating with the other compartment, vertical down draft and up draft flues arranged on each of the opposite sides of the oven chamber and communicating at their upper ends with said compartments, and horizontal flues connecting the lower ends of the vertical flues in pairs, said horizontal flues having beveled open end portions, and gravity doors for normally closing the same.

In witness whereof I have signed this specification in the presence of two witnesses.

CHARLES HOPE DOUGLAS HUNTER.

Witnesses:
A. L. CAREN,
A. J. CALLINAN.

---

Copies of this patent may be obtained for five cents each, by addressing the "Commissioner of Patents, Washington, D. C."